(12) United States Patent
Terada et al.

(10) Patent No.: US 7,372,256 B2
(45) Date of Patent: May 13, 2008

(54) ROTATION SENSOR

(75) Inventors: Shinsuke Terada, Chiyoda-ku (JP); Tomotaka Watanabe, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 202 days.

(21) Appl. No.: 10/912,127

(22) Filed: Aug. 6, 2004

(65) Prior Publication Data
US 2005/0030013 A1 Feb. 10, 2005

(30) Foreign Application Priority Data
Aug. 7, 2003 (JP) ............................. 2003-289364
Aug. 21, 2003 (JP) ............................. 2003-297234

(51) Int. Cl.
*G01B 7/30* (2006.01)
(52) U.S. Cl. ............................. 324/207.25; 324/207.16
(58) Field of Classification Search ........... 324/207.25, 324/207.16
See application file for complete search history.

(56) References Cited

FOREIGN PATENT DOCUMENTS

| JP | 2002-083535 | * | 3/2002 |
|----|-------------|---|--------|
| JP | 2002-98506  |   | 4/2002 |
| JP | 2002-083535 | * | 7/2003 |

* cited by examiner

*Primary Examiner*—Reena Aurora
(74) *Attorney, Agent, or Firm*—Oblon, Spivak, McClelland, Maier & Neustadt, P.C.

(57) ABSTRACT

A rotation sensor including a rotor mounted to a rotating shaft and having a conductive sensing unit which varies in width circumferentially thereof; and stationary cores each having an exciting coil being flown with an alternating exciting current for establishing a magnetic circuit with respect to the rotor and a core body formed of insulative magnetic material for retaining the exciting coil, and being mounted to the fixing member and disposed so as to oppose to the rotor at a distance in the axial direction of the shaft, wherein a core peripheral wall portion is formed in a corresponding area on the core body where the sensing unit project when viewed in the direction orthogonal to the sensing surface of the rotor, and the core peripheral wall portion is not formed in the area which is not corresponding thereto.

7 Claims, 17 Drawing Sheets

<Related Art>

<Related Art>

<Related Art>

ROTATION SENSOR

BACKGROUND

1. Field of the Invention

The present invention relates to a rotation sensor mounted to a rotor for detecting a rotation angle of the rotor.

2. Description of the Related Art

For example, when detecting the rotation angle of a handle attached to a rotational shaft, such as a steering shaft of a motor vehicle, integrally therewith, so-called a rotation sensor is used (For example, see JP-A-2002-98506).

As an example of such a rotation sensor, there is one having stationary cores arranged so as to oppose to a rotor at a predetermined distance. An example of the structure of the rotation sensor relating to the description below will be described as a related technology. Since the structure of the related technology introduced here is common to a rotation sensor according to embodiments of the present invention in detailed structure except for the shape of a coil core or the shape of a sensing unit, which are specific for the present invention, it will not be shown in the drawings.

The rotation sensor includes a rotor mounted to a rotating shaft, stationary cores each having a core body formed of insulative magnetic material and at least one exciting coil stored in the core body, and a rotation angle detecting unit. The exciting coil includes, for example, four pairs of exciting coils, which are arranged at regular intervals in the circumferential direction of the rotor, respectively. Accordingly, the rotational angle between 0° and 360° of the rotor is detected.

The rotor and the stationary cores are attached to a fixed member positioned in the vicinity of a shaft, and are stored in a case formed of metal or insulative magnetic material having a shielding property with respect to an alternating magnetic field, respectively. The rotation sensor is adapted to detect the rotation angle of the shaft based on variation in impedance of the exciting coil caused by the rotation of the shaft.

The rotor includes a supporting member formed into a disk shape of resin material having a good sliding property, such as POM (polyoxymethylene), and a conductive sensing unit connected to the supporting member via a stay member and continuously varying in width circumferentially thereof. The sensing unit is formed of conductive metal having a narrow portion having the minimum width and a wide portion having the maximum width located on the radially opposite side of the narrow portion, and is formed so that the width in the radial direction of the sensing unit varies according to the rotation angle of the rotor, whereby an eddy current having a magnitude corresponding to the width in association with the rotation is induced by the alternating magnetic field. The impedance of the exciting coil varies with variations in the amount of the eddy current induced by the sensing unit. The sensing unit has a shape of simple outline in which the width is varied in the circumferential direction thereof by setting the centers of an inner diameter circle and an outer diameter circle at the positions so as to be deviated from each other for the sake of ease of formation thereof as described later (See FIG. 16).

One of the pair of stationary cores is mounted on a printed board constituting a measuring apparatus and is arranged so as to oppose to the other stationary core mounted to a case on the opposite side of the sensing unit of the rotor at a predetermined distance. The stationary core includes a core body formed of insulative magnetic material, and an exciting coil to be stored in the core body (See FIG. 17). Then, the predetermined exciting coils are connected in series, respectively, and establish a magnetic circuit around the stationary core by an alternating exciting current from a measuring unit.

The measuring apparatus includes a phase shifting unit, a phase shifting amount detecting unit, and a converter connected in four rows between a frequency divider circuit and a measuring unit. Output signals from a pair of converters are differentiated and then amplified by a differential amplifier, and are fed to an A/D converter of the measuring unit as output of the voltage signal. A shift level adjusting unit for adjusting the voltage level of the amplified voltage value is also connected to the differential amplifier.

An oscillation circuit outputs oscillation signals of a specific frequency to the phase shifting unit including a resistance, an exciting coil, and a capacitor via the frequency divider circuit. At this time, the phase of the voltage signals at both ends of the respective capacitors varies with variations in impedance, described above, of the respective exciting coils. The voltage signals at both ends of the capacitor are outputted to the phase shifting amount detecting unit. The respective phase shifting amount detecting unit detects the phase sifting amount of the voltage signals at both ends of the respective capacitors. The converter has a function to covert the detected phase shifting amounts into the corresponding voltage values.

The output, which corresponds to the amplified two differential signals and the output signals from the four converters are supplied to the measuring unit. Accordingly, the measuring unit compares the relative magnitudes of the four output signal levels in a first place. As a consequence, the positions where the respective exciting coils are disposed are determined by the sensing unit of the rotor. As shown in FIG. 15, an output according to the rotation angle detected by the four pairs of coils is obtained. As shown in the same drawings, the respective output voltages (V) of the exciting coils exhibit projected peaks at positions apart from each other by 180°, which are generated corresponding to the two connecting portions of the rotor.

In the same drawing, the rotation angle of the rotor is measured over the entire range between 0° and 360° using alternately repeated four areas A except for the projected peaks.

The rotor and the stationary core are mounted to the fixed member positioned in the vicinity of the shaft, and are stored in the case having an upper case and a lower case. The rotation sensor is adapted to detect the rotation angle of the shaft based on variations in the impedance of the exciting coils caused by the rotation of the rotor.

Subsequently, a problem in improvement of the detecting accuracy of the rotation sensor will be described. More specifically, problems occurring when assembling the rotation sensor and problems occurring when using the rotation sensor are described, respectively.

The problems occurring when assembling the rotation sensor will be described first.

FIG. 17 shows an appearance of a stationary core 700 used for the rotation sensor according to the related technology (See FIG. 17A), and a state of a magnetic flux generated in the stationary core (See FIG. 17B).

As is clear from FIG. 17A, a core body 720 of the stationary core 700 includes a disk-shaped base member 721, a core peripheral wall portion 722 projecting upward from the entire periphery of the base member 721, and a column shaped projection 723 projecting upward from the center of the base member 721. Accordingly, the magnetic flux generated in the stationary core 700 generates radially from the column shaped projection 723 of the core body surrounded by an exciting coil 710 (See an arrow in FIG. 17B). In other words, the magnetic flux is generated not only in the direction in which the sensing unit of the rotor extends, but also in the direction intersecting therewith.

In this manner, when the magnetic flux is generated in the direction intersecting with the sensing unit, and the relative position between the exciting coil and the core body is displaced or the center of the rotor and the center of the stationary core is displaced, variations occurs in the amount of magnetic flux of the stationary cores passing across the sensing unit of the rotor even when the displacement is within the tolerance in dimension or assembly of the components of the sensing unit or the stationary cores. Consequently, deviations in output properties may occur unless the tolerance level in dimension or assembly of the components of the sensing unit or the stationary cores is set up very small. As a consequence of containing such an error, in the case of the rotation sensor in the related technology, it is necessary to set the tolerance in dimension of all components or the tolerance in assembly of the components of the rotation sensor to an extremely small value when mass-producing the same.

Subsequently, the problems which occur when using the rotation sensor will be described. As described above, the sensing unit is designed so that the centers of two circles being different in size are slightly deviated from each other and, in this state, these two circles define an outline thereof in the sake of ease of design or manufacturing. More specifically, as an example, the respective centers of a circle of about 52 mm in diameter and a circle of about 57 mm in diameter are deviated away from each other by 0.75 mm each as shown in FIG. 16, so that a combination of circles whereof the centers are eventually deviated by 1.5 mm defines the outline of the sensing unit. Consequently, the width of the wide portion of the sensing unit is 4 mm and the width of the narrow portion thereof is 1 mm. However, the area of the portions of the coils and the sensing unit overlapped with each other when viewed in the direction orthogonal to the sensing surface (the projecting area of the sensing unit with respect to the coils when viewed in the direction orthogonal to the sensing surface) does not increase proportionally according to the rotation angle of the sensing unit (that is, the rotor). Therefore, the output values of the four areas A in a state of substantially linear other than the projected peaks shown in FIG. 15 obtained via the sensing unit as described above are not linear in a narrow sense.

As described above, since the sensing unit in the related art is simply varied in width in the circumferential direction by simply combining circles in different size, the output voltage directly obtained with respect to the rotation angle of the rotor is sinusoidal signals. It is also conceivable to eventually obtain a desirable linear output using a measure for approximating the sinusoidal signals to linear signals. However, an error may be contained in the course of approximating the sinusoidal signals.

In other words, since the area of the portion of the sensing unit corresponding to the coils does not change linearly with variations in the rotation angle of the rotor, and hence an error is contained in both cases where the output voltage is directly used and where it is approximated to a linear shape, it is difficult to detect the rotation angle with high degree of accuracy with the rotation sensor in the related technology.

SUMMARY

Accordingly, it is an object of the present invention to provide a rotation sensor which can obtain an adequate rotational output according to variations in a rotation angle of a rotor so that the angle can be detected with high degree of accuracy.

More specifically, it is a first object of the present invention to provide a rotation sensor which can achieve a high detecting accuracy by reducing fluctuations in amount of magnetic flux in a sensing unit due to relative displacement of the rotor caused by part tolerances or assembly tolerance of parts constituting the rotation sensor.

It is a second object of the present invention to provide a rotation sensor with high detecting accuracy in which the rotational output is linearly changed in accordance with variations in the rotation angle of the rotor.

In order to solve the first problem described above, a first aspect of the present invention is a rotation sensor to be mounted to a rotating member for detecting the rotation angle of the rotating member, including a rotor mounted to a rotating shaft and having a conductive sensing unit which varies in width circumferentially thereof, and stationary cores each having an exciting coil being flown with an alternating exciting current for establishing a magnetic circuit with respect to the rotor and a core body formed of insulative magnetic material for retaining the exciting coil, and being mounted to the fixed member and disposed so as to oppose to the sensing unit of the rotor at a distance in the axial direction of the shaft, wherein the output signals generated by the cooperation between the coil and the rotor vary adequately in accordance with the rotation angle of the rotor.

Since the output signals generated by the cooperation between the coil and the sensing unit of the rotor vary adequately in accordance with the rotation angle of the rotor, detection of the rotation angle without errors and with high degree of accuracy is enabled.

The second aspect of the present invention is a rotation sensor in the first aspect of the present invention including a core peripheral wall portion is formed in a corresponding area on the core body where the sensing unit project when viewed in the direction orthogonal to the sensing surface of the sensing unit, and the core peripheral wall portion is not formed in the area which is not corresponding thereto.

When the peripheral wall portion of the core body is formed in the area which does not overlap with the sensing surface when viewed in the direction orthogonal to the sensing surface, a magnetic flux generated from this portion varies an eddy current generating at the sensing unit when the sensing unit and the stationary cores are relatively displaced, whereby the output impedance varies and generates an error in rotation detecting accuracy. However, the rotation sensor according to the present invention, since the core peripheral wall portion is not formed in this area, the amount of the magnetic flux which may affect the eddy current of the sensing unit due to displacement between the sensing unit and the stationary cores as described above is reduced. Therefore, even when the relative position between the sensing unit and the stationary cores are displaced based on the respective part tolerances or the assembly tolerance, variations in the output impedance is small, and hence the error of the rotation detecting accuracy is also small.

The third aspect of the present invention is a rotation sensor in the first aspect of the present invention including a projection surrounded by the exciting coils of the stationary core is formed into an elongated shape in the direction intersecting with the direction in which the sensing unit extends.

When the projection of the stationary core surrounded by the exciting coils is formed into a column shape, the magnetic flux is radiated uniformly in the direction of a normal line of the outer peripheral surface of the column. Consequently, when the sensing unit and the stationary cores are relatively displaced, the magnetic flux in the direction intersecting with the direction in which the sensing unit extends varies the eddy current generated at the sensing unit, whereby the output impedance varies to generate an error in rotation detecting accuracy.

However, when the projecting of the core body surrounded by the exciting coil is formed into an elongated shape in the direction intersecting with the direction in which the sensing unit extends, the amount of the magnetic flux in the direction intersecting with the direction in which the sensing unit extends is reduced. Consequently, even when the relative position between the sensing unit and the stationary cores are displaced due to the respective part tolerances or the assembly tolerance, variations in the output impedance is small and hence the error in rotation detecting accuracy is also small.

Preferably, the fourth aspect of the present invention is a rotation sensor in the third aspect of the present invention of the rotation sensor including the center portion of the projection of the core body surrounded by the exciting coil is formed to be lower than the both sides thereof.

Since the center portion of the projection surrounded by the exciting coil of the stationary core is formed to be lower than both sides thereof, in the cooperation with the fact that the projection of the core body in the third aspect of the invention is formed into an elongated shape in the direction intersecting with the direction in which the sensing unit extends, the magnetic flux is generated in substantially the same magnitude over the entire width of the sensing unit. Consequently, even when the sensing unit and the stationary cores are displaced due to the respective part tolerance or the assembly tolerance, variations in the output impedance is further reduced, and hence the error in rotation detecting accuracy is further reduced.

In order to solve the second problem described above, a rotation sensor according to the fifth aspect of the invention is a rotation sensor in the first aspect of the present invention including output signals generated by the cooperation between the coil and the rotor vary linearly in accordance with the rotation angle of the rotor.

Since the output signals generated by the cooperation between the coil and the sensing unit of the rotor vary linearly in accordance with the rotation angle of the rotor, detection of the rotation angle with high degree of accuracy without errors is enabled.

Preferably, the sixth aspect of the present invention is a rotation sensor in the fifth aspect of the present invention of the rotation sensor including the areas of the portion of the sensing unit corresponding to the stationary cores vary linearly in proportion to variations in the rotation angle of the rotor.

Since the output signals generated by the cooperation between the coil and the rotor can be linearly varied in accordance with the rotation angle of the rotor without performing specific signal correction process, and hence detection of the rotation angle with high degree of accuracy without errors can be reliably performed.

DETAILED DESCRIPTION OF THE PREFERRED EMBODIMENTS

Figure 1:
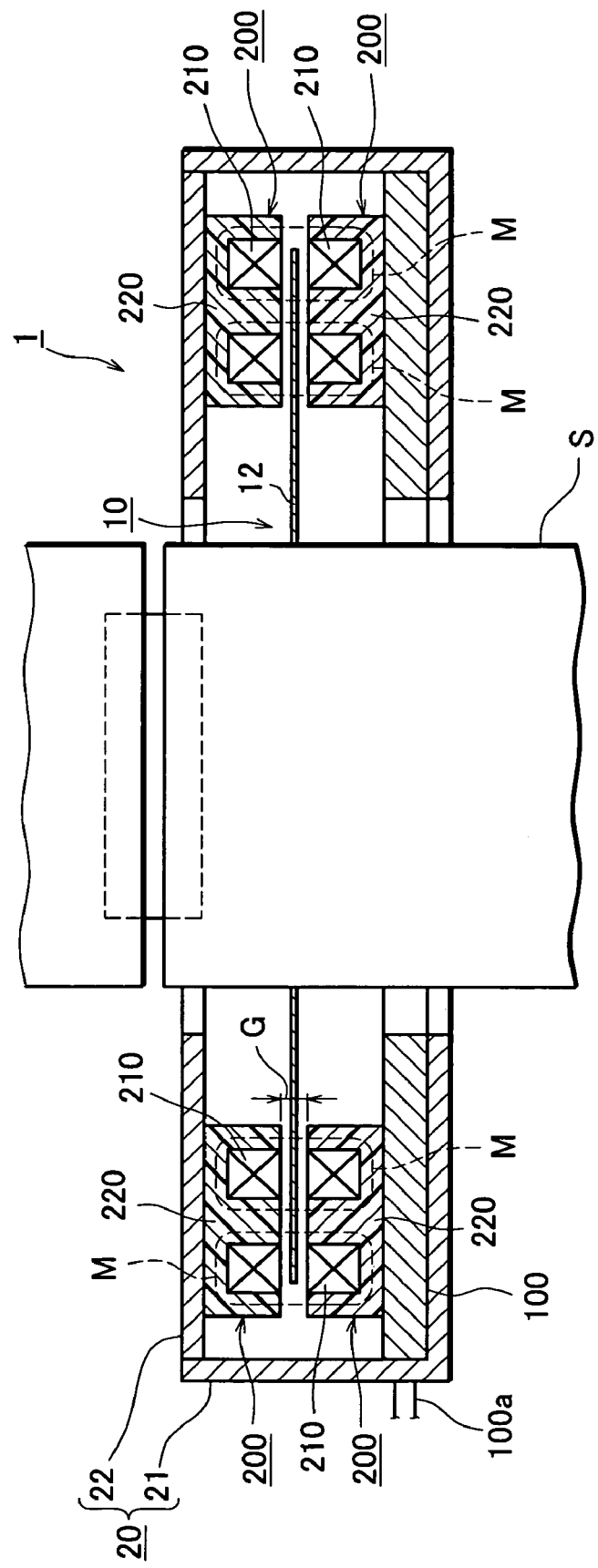
FIG. 1 is a cross-sectional view of a basic configuration of a rotation sensor according to a first embodiment of the invention, showing a state in which the rotation sensor is mounted to a steering shaft.

Referring now to the drawings, a rotation sensor according to first and second embodiments of the invention will be described.

In the first place, referring to FIG. 1 to FIG. 8, a rotation sensor 1 according to the first embodiment of the invention will be described.

In the description, a case in which the rotation sensor is attached to a steering shaft in a steering device of a motor vehicle for detecting a rotation angle of a handle will be described.

Figure 2:
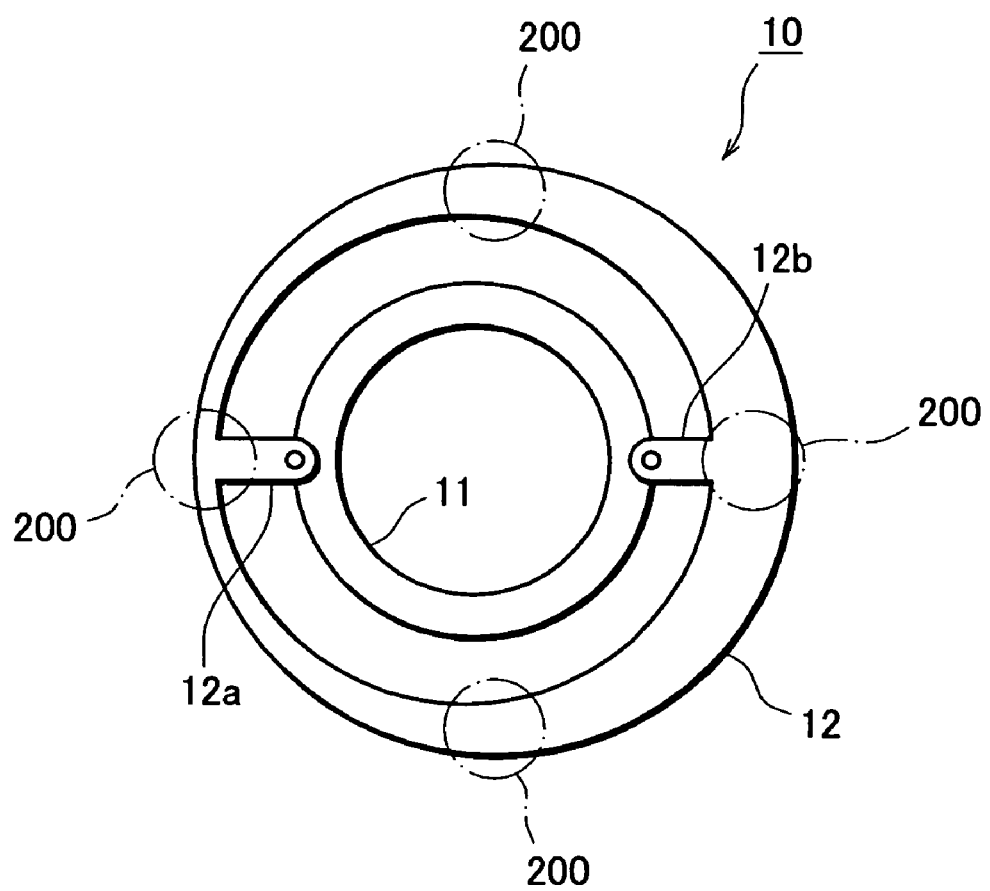
FIG. 2 is a plan view showing a relative position of a sensing unit of the rotation sensor according to the first embodiment of the invention and stationary cores disposed so as to oppose to each other with the intermediary of the rotation sensor.

As shown in FIG. 1, the rotation sensor 1 according to the present embodiment of the invention includes a rotor 10 to be mounted to a rotating shaft S, stationary cores 200 having core bodies 220 formed of insulative magnetic material and exciting coils 210 to be stored in the core bodies 220, and a rotation angle detecting unit 100. The exciting coils 210 are, as shown in FIG. 2, disposed at regular intervals circumferentially of the rotor 10 so that for example four exciting coils on one side sandwich a sensing unit 12 of the rotor with four exciting coils on the other side, not shown, in pairs, whereby the rotation angle between 0° and 360° of the rotor 10 is detected through. Although four stationary cores 200 are disposed so as to oppose to each other in the present embodiment, the number of the stationary cores 200 to be disposed may be changed depending on the rotation angle to be detected. The reason why two stationary cores 200 are disposed so as to oppose to each other is as follows. When the position of the rotor 10 is fluctuated in the axial direction of the steering shaft S due to vibration or the like, for example, in the case where the rotation sensor is mounted to a vehicle, the outputs from the respective stationary cores 200 are also fluctuated correspondingly. However, when the output from one stationary core 200 is increased, the output from the other stationary core 200 is decreased correspondingly. Therefore, by detecting the outputs from the two stationary cores 200, the fluctuations in output of the respective stationary cores 200 can be compensated. When the rotation sensor is disposed at the positions where the rotation sensor is not affected by vibrations or the like, it is not necessary to dispose the stationary cores at the opposed positions. In the first embodiment, the respective cores are designated by the identical numeral "200" in the drawings, the respective exciting coils are designated by the identical numeral "210", and the core bodies are designated by the identical numeral "220" in the drawings for the convenience of description.

The stationary core 200 and the rotation angle detecting unit 100 are stored in a case 20 formed of metal or insulative magnetic material having a shielding property for an alternating magnetic field as shown in FIG. 1, and mounted to a fixed member (not shown) located in the vicinity of the shaft S via the case 20. The case 20 includes an upper case 21 and a lower case 22. The rotation sensor 1 is adapted to detect the rotation angle of the shaft S based on fluctuation of impedance of the exciting coils 210 due to the rotation of the shaft S.

As shown in FIG. 2, the rotor 10 includes a supporting member 11 formed of insulative magnetic material, and a sensing unit 12 connected to the supporting member 11 via stay members 12a, 12b, and having a width continuously changing in the circumferential direction. As shown in FIG. 2, the sensing unit 12 includes a narrow portion having the minimum width and a wide portion having the maximum width located on the opposite side from the narrow portion in the radial direction. The sensing unit 12 is formed of metal having conductivity such as aluminum, copper, silver, iron, or brass, and has dimensions of 50 mm in outer diameter, 45 mm in inner diameter, 0.5 mm in thickness as an example.

It is configured to vary in the radial width corresponding to the rotation angle of the rotor 10, so that the an eddy current of a magnitude based on the area of the portion of the sensing width corresponding to the respective exciting coils is induced by an alternating magnetic field, described later, in association with the rotation of the rotor. The impedance of the exciting coils 210 is fluctuated with variations in the amount of the eddy current induced by the sensing unit 12 of the rotor 10.

For example, the stationary core 200, described later, has dimensions of 16 mm in outer diameter, and 8 mm in outer diameter of a projection 223. Accordingly, the range of errors in the relative position of the sensing unit 12 and the stationary cores 200 of the rotor will be, for example, ±0.5 mm, as a result of integration of the part tolerances or the assembly tolerance.

On the other hand, the stationary core 200 on one side to be fixed to the lower case 21 is mounted on a printed board which constitutes the rotation angle detecting unit 100, and is positioned on the opposite side of the rotor 10 from the stationary core 200 on the other side at a distance G so as to oppose to each other (See FIG. 1). The stationary core 200 on the other side is mounted to the upper case 22 of the case 20. The stationary cores 200 opposing to each other at a predetermined distance each include a core body 220 formed of insulative soft magnetic material such as plastic magnet (for example, mixed soft magnetic material which is obtained by mixing Mn—Zn soft magnetic ferrite to PPS (polyphenylene sulfide) and the exiting coil 210 stored in the core body 220. The opposed exciting coils 210 are connected with respect to each other in series, electrically connected to the printed board in the rotation angle detecting unit 100 in the case 20, generate an AC magnetic field therearound by being flown with an alternating exciting current, and establish a magnetic circuit as shown by dotted line M in FIG. 1 between each pair of stationary cores. Then, when the magnetic flux passes across the sensing unit 12 of the rotor 10, an eddy current is induced on the surface of the sensing unit 12.

The relative position of the exciting coil 210 and the core body 220 are displaced due to the part tolerances or the assembly tolerances. Variations in the amount of displacement occur often when the rotation sensors are actually mass-produced. Therefore, in the case of the rotation sensor relating to the related technology, even when the sensing unit and the core bodies of the rotor are in the relative position within the allowable range, distribution of the magnetic flux to the sensing unit is displaced due to the aforementioned tolerances, and fluctuations may occur in the detected outputs. However, when the stationary core 200 according to the first embodiment and the related modifications is used, the stationary core 200 generates a specific magnetic flux distribution, described below, due to its shape. Therefore, even when the core body 220 and the exciting coils 210 are displaced, the state of the magnetic flux with respect to the sensing unit 12 of the rotor does not change and, consequently, stable detected outputs may be obtained irrespective of generation of such displacement.

The specific shape and the magnetic flux distribution in association with the shape relating to the core body 220 of the stationary core 200 will be described below.

Figure 3A:
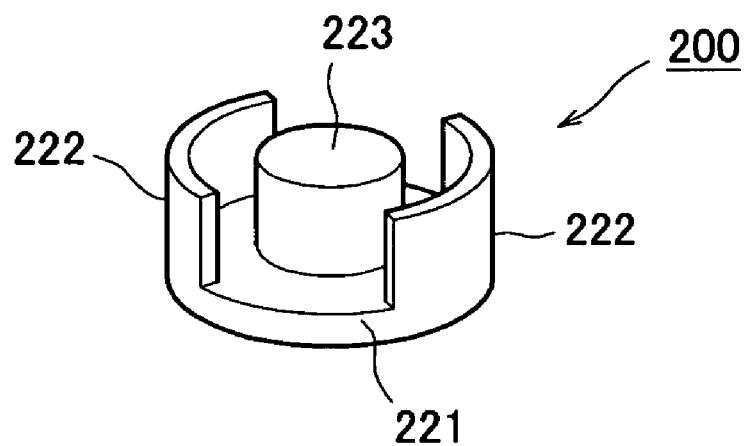
FIG. 3A and FIG. 3B are a perspective view of a core body of the rotation sensor (FIG. 3A), and a plan view of the core body of the rotation sensor showing together with of the action of lines of magnetic flux (FIG. 3B) according to the first embodiment of the invention.
Figure 3B:
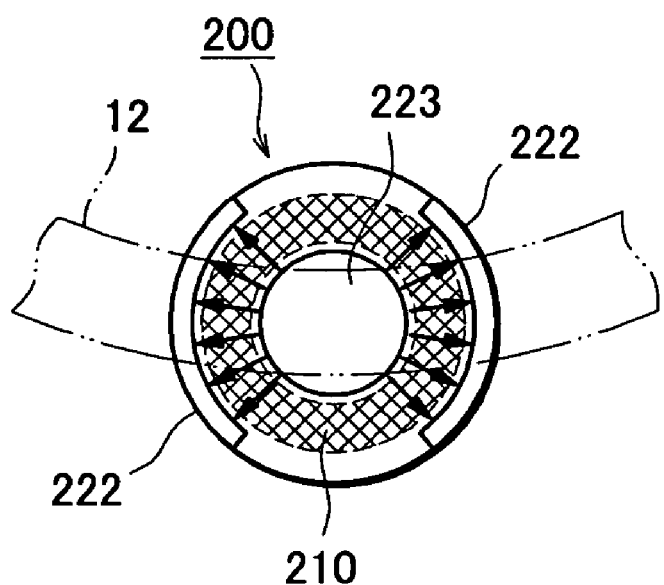

The core body 220 includes a disk-shaped base member 221, and a core peripheral wall portion 222 projecting upward from part of the peripheral edge of the base member 221, and a column shaped projection 223 projected upward from the center of the base member 221, as shown in FIG. 3A. The range of formation of the core peripheral wall portion 222 is a range which is overlapped with the sensing unit 12 of the rotor 10 when viewed in the direction orthogonal to the sensing surface (the range where the sensing surface is projected on the core body 222 when viewed in the direction orthogonal to the sensing surface of the rotor 10) (See FIG. 3B). In this case, as shown in FIG. 3B, the maximum width of the sensing unit 12, which varies in width in the circumferential direction, is formed to be narrower than the diameter of the projection 223, so that both of them can always be opposed within a range in which the sensing unit 12 and the projection 223 are relatively displaced.

In this manner, since the core peripheral wall portion is not formed in the portion which is not overlapped with the sensing surface when viewed in the direction orthogonal to the sensing surface of the sensing unit 12, the amount of the magnetic flux in this area is small. In other words, the magnetic flux generated in the stationary core 200 is generated mainly in the direction in which the sensing unit 12 extends, and hence is not generated much in the direction intersecting with the sensing unit 12 (See FIG. 3B). Accordingly, even when the relative position between the sensing unit 12 and the stationary core 200 is relatively displaced within the range of the respective part tolerances or the assembly tolerance, the state of the magnetic flux which passes through the sensing unit 12 does not change much. Therefore, even when such displacement is occurred, variations in the amount of the eddy current generating in the sensing unit 12 is small and, consequently, variations in the output impedance is reduced correspondingly in the course of signal processing, described later, whereby the errors in rotation detecting accuracy is reduced.

On the other hand, the rotation angle detecting unit 100 is fixed to the lower case 21, described later, of the case 20, as shown in FIG. 1. The rotation angle detecting unit 100 is adapted to be connected to a power source and a wire harness for signal transmissions via a plurality of wires 100a extending from the case 20 toward the outside, and connected to an external device provided outside the case 20.

Figure 4:
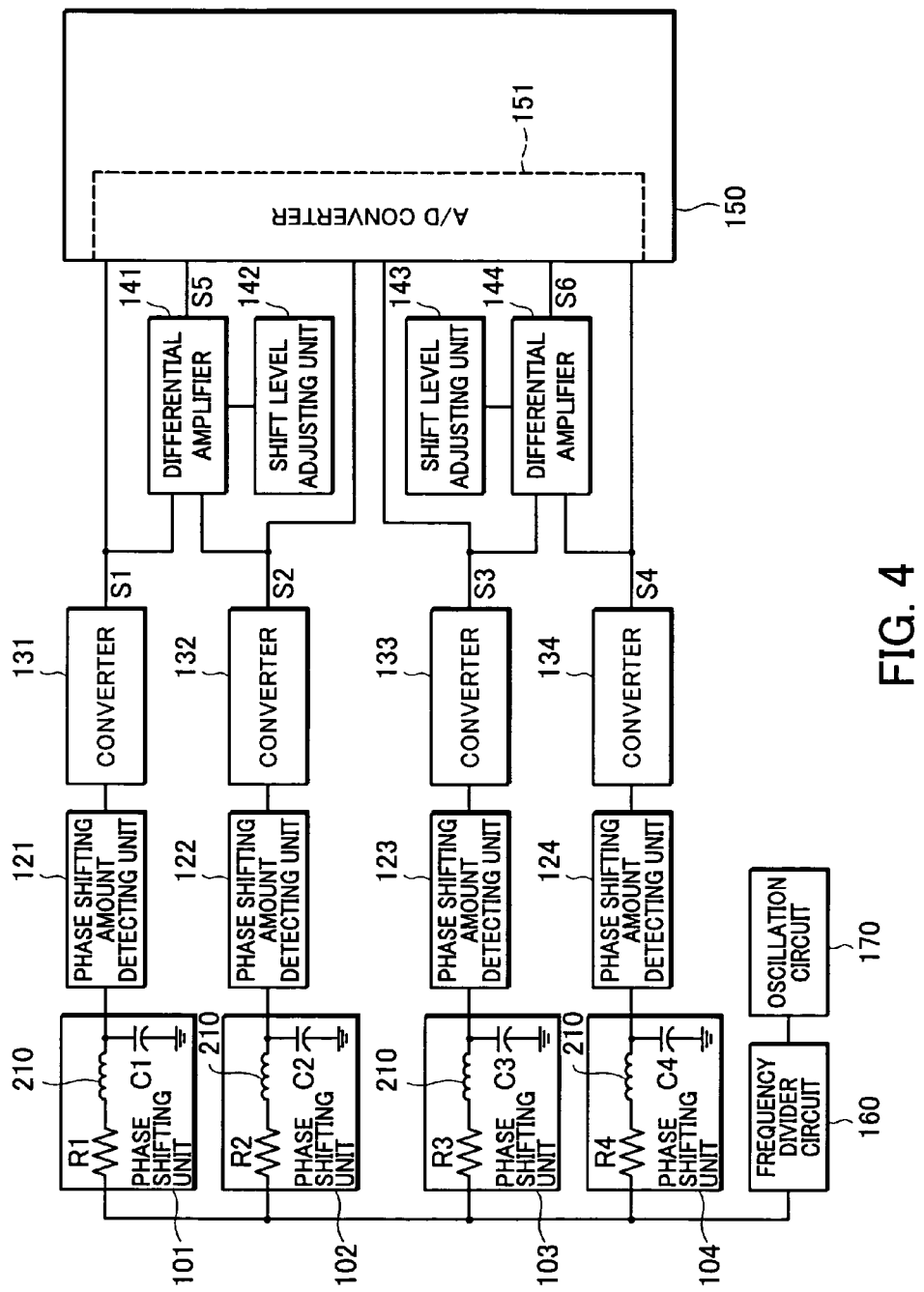
FIG. 4 is a block diagram showing a signal processing circuit relating to detection of the rotation angle of the rotation sensor according to the first embodiment.

The rotation angle detecting unit 100 is, as shown in the circuit block diagram in FIG. 4, includes phase shifting units 101-104, phase shifting amount detecting units 121-124, and converters 131-134 connected in parallel in four rows between a frequency divider circuit 160 and a measuring unit 150. An output signal S1 from the converter 131 and an output signal S2 from the converter 132 are amplified and outputted as voltage signal output S5 to an A/D converter 151 of the measuring unit 150 after having been differentiated by a differential amplifier 141. A shift level adjusting unit 142 for adjusting the voltage level of the amplified voltage value is connected to the differential amplifier 141.

In the same manner the output signal S3 of the converter 133 and the output signal S4 of the converter 134 are differentiated and then amplified by the differential amplifier 144, and are outputted to the A/D converter 151 of the measuring unit 150 as the voltage signal output S6. Further a shift level adjusting unit 143 for adjusting the voltage level of the amplified voltage value is connected to the differential amplifier 144. The frequency divider circuit 160 may be provided as needed. Likewise, a buffer amplifier may precede the phase shifting unit 101-104.

Subsequently, the signal processing method in the rotation sensor 1 will be described in detail.

An oscillation circuit 170 outputs oscillation signals of a specific frequency via the frequency divider circuit 160 to the phase shifting units 101-104 including resistances R1-R4 shown in FIG. 4, exciting coils 210, and capacitors C1-C4. At this time, the impedances of the respective exciting coils 210 vary according to the magnitude of generation of the eddy current in the sensing unit 12 of the rotor, and in association with variations in the impedance, the phases of the voltage signals at both ends of the respective capacitors C1-C4 vary correspondingly. The voltage signals at both ends of the capacitors C1-C4 are outputted to the phase shifting amount detecting units 121-124, where the phase shifting amount of the voltage signals at both ends of the respective capacitors C1-C4 are detected.

The converters 131-134 convert the detected phase shifting amount to a corresponding voltage value. Then the outputs S5, S6, which are amplified two differential signals and the output signals S1-S4 from the four converters 131-134 are supplied to the measuring unit 150 including, for example, a single-chip microprocessor or the like. Accordingly, the measuring unit 150 compares the level (magnitude relations) of the four output signals S1-S4 in the first place. Then, the positions where the respective exciting coils 210 are disposed are determined by the sensing unit 12 of the rotor 10.

As described above, the signal processing is performed by utilizing variations in the impedance based on variations in the amount of the eddy current generating at the sensing unit 12 corresponding to the rotation angle of the rotor 10 to detect the rotation angle of the rotor.

For this detection, even when the relative position between the stationary core 200 and the sensing unit 12 is displaced based on the part tolerances or the assembly tolerance between the respective parts of the exciting coils 210 of the stationary core 200, the core body 220, and the sensing unit 12 of the rotor 10, since the core body 220 has a special shape as described above, the effect of the displacement on the magnetic flux passing through the sensing unit 12 can be controlled to the maximum value. Consequently, since the stable detection output can be obtained constantly without being affected by the part tolerances or the assembly tolerance, variations in the detecting accuracy in association with the mass production of the rotation sensors can further be reduced.

Although the core peripheral wall portion 222 of the stationary core 200 has been described to be formed on the portion of the stationary core 200 where the sensing unit 12 of the rotor 10 is projected when viewed in the direction orthogonal to the sensing surface, the region to be formed is not limited to this portion in a narrow sense in terms of dimensions, but there may be a certain displacement in dimension in the region to form the sensing unit 12 as long as the sensing unit 12 and a projection 323 are constantly opposed to each other within the range in which both of them are relatively displaced, as a matter of course.

Figure 5A:
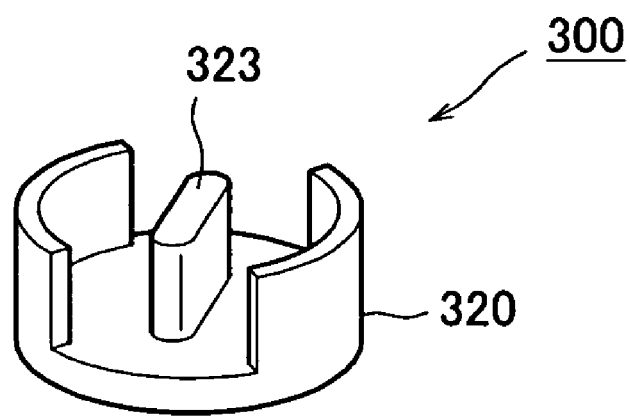
FIG. 5A and FIG. 5B are a perspective view showing a modification of the core body of the rotation sensor shown in FIG. 3 (FIG. 5A), and a plan view showing together with the action of lines of magnetic flux (FIG. 5B)
Figure 5B:
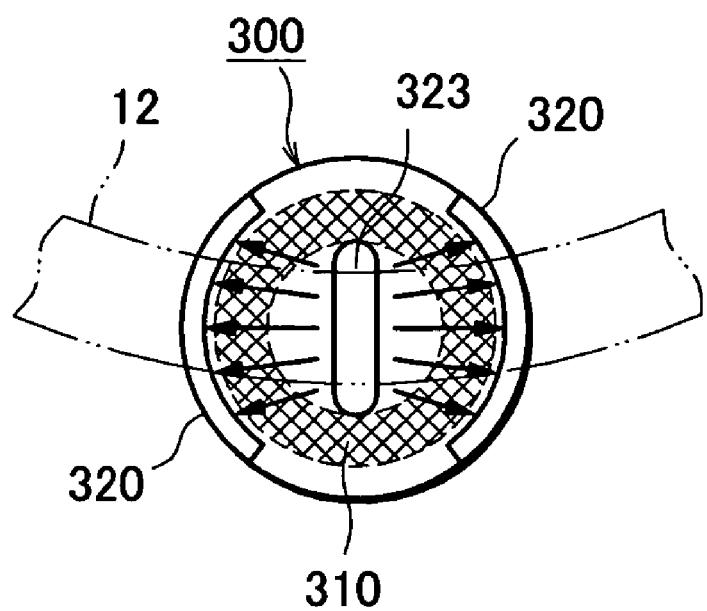

As a first modification of the above-described stationary core 200, as shown in FIG. 5, it is also possible to form the projection 323 of a core body 320 surrounded by an exciting coil 310 (See FIG. 5B) of a stationary core 300 into an elongated shape in the direction intersecting with the direction in which the sensing unit 12 extends. In this case, as shown in FIG. 5B, the maximum width of the sensing unit 12, which varies in width in the circumferential direction, is formed to be narrower than the width of the projection 323, and the sensing unit 12 and the projection 323 are disposed so as to be constantly opposed to each other within the range in which the sensing unit 12 and the projection 323 are relatively displaced.

When the projection 323 surrounded by the exciting coil 310 of the core body 320 is formed into an elongated shape in the direction intersecting to the direction in which the sensing unit 12 extends, the amount of magnetic flux radiated in the direction intersecting with the direction in which the sensing unit 12 extends is further reduced. As a consequence, even when the relative position between the sensing unit 12 and the stationary core 300 are displaced due to the respective part tolerances or the assembly tolerance, variations in the output impedance are further reduced, and hence the errors in the rotation detecting accuracy are further reduced correspondingly.

Although the core body 320 shown in FIG. 5 is not formed with part of the peripheral wall as in the case of the core body 220 described above, part of the peripheral wall is not necessarily required to be removed as long as the projection 323 is formed into an elongated shape in the above-described direction. In other words, even when the peripheral wall is formed over the entire periphery of the core body, a significant part of the above-described advantages may be achieved if the projection 323 is formed into an elongated shape as described above.

Figure 6A:
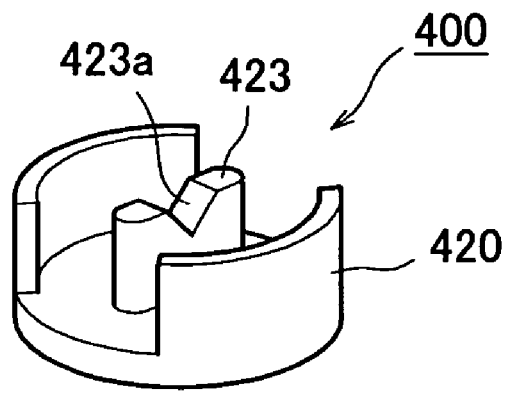
FIG. 6A and FIG. 6B are a perspective view showing another modification of the core body shown in FIG. 5 (FIG. 6A), and a plan view showing together with distribution of the magnetic flux of the core body (FIG. 6B)
Figure 6B:
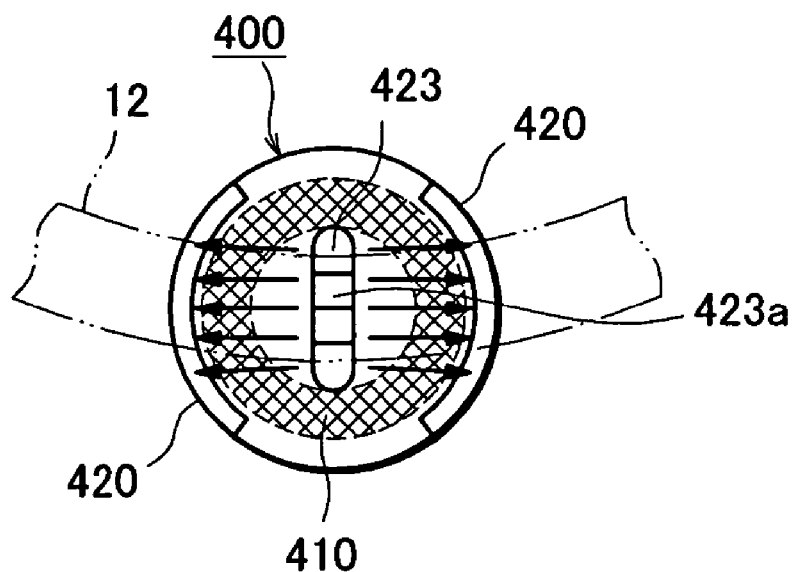

Furthermore, as a second modification of the above-described stationary core 200, as shown in FIG. 6, it is also possible to configure in such a manner that, in addition to a projection 423 surrounded by an exciting coil 410 (see FIG. 6B) of a stationary core 400 is formed into an elongated shape in the direction intersecting with the direction in which the sensing unit 12 extends, a center portion 423a of the projection 423 may be formed to be lower than the both sides thereof.

In the second modification, the center portion 423a of the projection 423 surrounded by the exciting coil 410 of the stationary core 400 is formed to be lower than the both sides thereof. Therefore, as in the first modification, different from the case in which the projection 323 of the core body 300 is formed simply into an elongated shape in the direction intersecting with the direction in which the sensing unit 12 extends, the magnetic flux is generated at substantially equal magnitude over the width of the sensing unit 12 (See and compare FIG. 5B and FIG. 6B). As a consequence, even when the sensing unit 12 and the stationary core 400 are displaced due to the respective part tolerances and the assembly tolerance, the output impedance can hardly be changed, and hence the errors in the rotation detecting accuracy can be reduced.

In the case of the core body 420 shown in FIG. 6 as well, as long as the projection 423 is formed into an elongated shape as in the case of the core body 320 shown in FIG. 5, it is not necessarily required to remove part of the peripheral wall. In this case as well, as shown in FIG. 6B, the maximum width of the sensing unit 12 having a width varying in the circumferential direction is smaller than the width of the projection 423, and the sensing unit 12 and the projection 423 are constantly opposed to each other within the range in which the sensing unit 12 and the projection 423 is relatively displaced. Accordingly, even when the peripheral wall is formed over the entire periphery of the core body, a significant part of the above described advantages may be achieved.

Although it is not shown here, in addition to the above-described embodiments, the magnetic flux generating in the direction in which the sensing unit extends may be uniformized even when the portion of the peripheral wall which overlaps with the sensing unit is not bent but flattened when viewed in the direction orthogonal to the sensing surface of the sensing portion (for example, the peripheral wall 222 of the core body 220 shown in FIG. 3) in top view, whereby generation of errors in detected output based on the part tolerances or the assembly tolerance of the rotor and the stationary core can be prevented.

EXAMPLE 1

A comparative evaluation test was conducted for the rotation sensor provided with the stationary core 200 of the first embodiment (hereinafter referred to as the present example), the rotation sensor provided with the stationary core 300 according to the first modification (hereinafter referred to as the first modification), with respect to the rotation sensor provided with the stationary core 400 according to the second modification (hereinafter referred to as the second modification), are compared and verified the rotation sensor provided with a stationary core 700 described as the related technology (hereinafter referred to as the comparative example).

Figure 7:
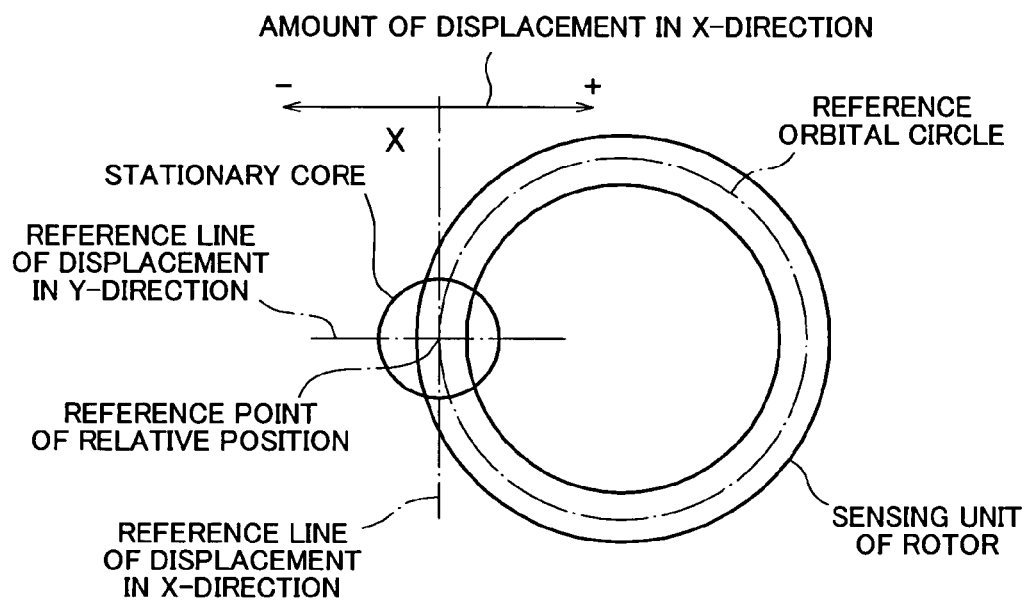
FIG. 7 is a drawing showing a relation between the sensing unit of the rotation sensor and the stationary core and a reference point of displacement determined when comparing between the first example of the invention and the comparative example.

For this comparative evaluation, as shown in FIG. 7, the sensing unit of the rotor having a constant width and the stationary core were mounted at their reference positions, then, the stationary core and the sensing unit were displaced with respect to each other as shown by an arrow X in the drawing, and simultaneously, the detected output corresponding to the amount of displacement (the amount of deviation) was measured. As regards the rotation sensor according to the invention, as described above, the amount of displacement and the detected output were obtained as regards the stationary core 200 according to the first embodiment, the stationary core 300 according to the first modification, and the stationary core 400 according to the second modification.

Figure 8:
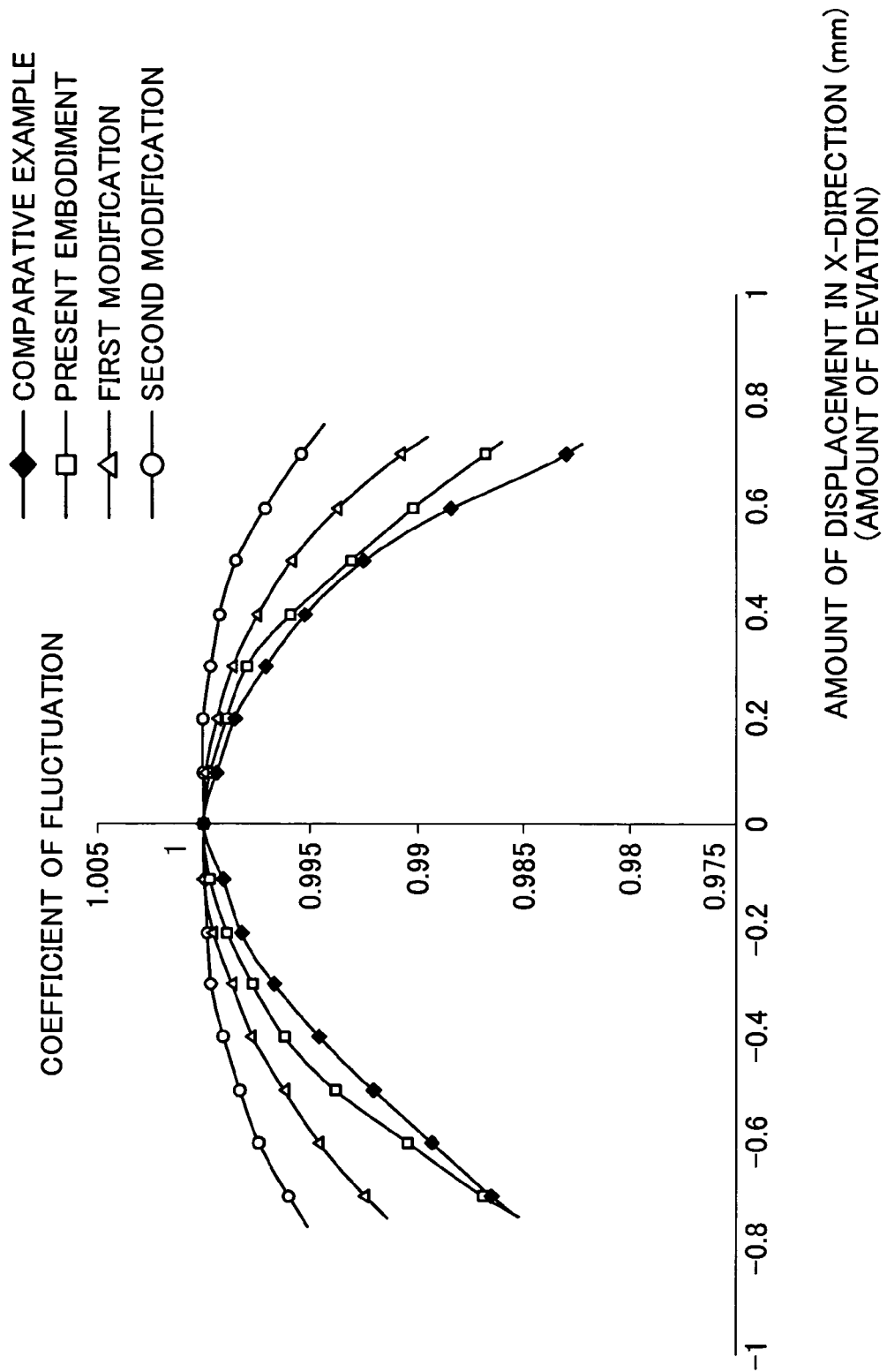
FIG. 8 is an output characteristic drawing showing the relation between the amount of deviation between the sensing unit and the stationary core, and the coefficient of output fluctuation relating to the core body of the rotation sensor according to the first embodiment of the invention, a modification, another modification, and a comparative example provided with the rotation sensor and the core body in the related art.

Consequently, the detected result as shown in FIG. 8 was obtained. In FIG. 8, the lateral axis represents the amount of displacement (the amount of deviation) of the stationary core and the sensing unit of the rotor with respect to the widthwise direction of the sensing unit, and the vertical axis represents the ratio between the detected output when the stationary core and the sensing unit of the rotor are disposed at the reference positions respectively, which is defined as "1", and the output at a reference position obtained when the relative position was displaced.

As is clear from the drawings, it was found that variations in coefficient of output fluctuation with respect to the amount of deviation of the rotation sensor having the stationary core in the related technology was the largest, and the variations in coefficient of output fluctuation with respect to the amount of deviation of the rotation sensor having the stationary core according to the second modification was the smallest. The variations in coefficient of the output fluctuation with respect to the amount of deviation between rotation sensor having the stationary core according to the first embodiment and the rotation sensor having the stationary core according to the first modification was smaller than the case of the rotation sensor having the stationary core in the related technology, whereby usability of the invention could be evaluated.

Subsequently, the rotation sensor according to the second embodiment of the invention will be described based on FIG. 9 to FIG. 14. In the description, the case in which the rotation sensor is attached to the steering shaft of the steering device for a motor vehicle and used for detecting the rotation angle of a handle will be described.

Figure 9:
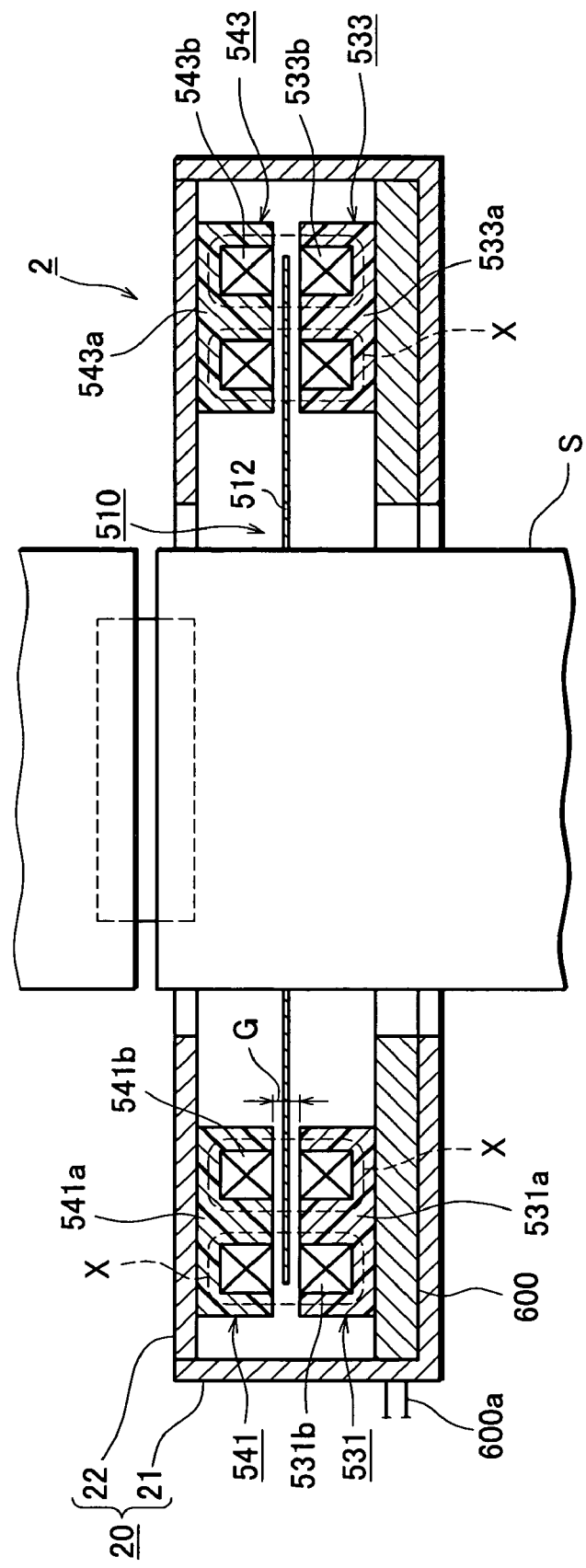
FIG. 9 is a cross-sectional view of a rotation sensor according to a second embodiment of the invention showing a state of being mounted to the steering shaft.
Figure 10:
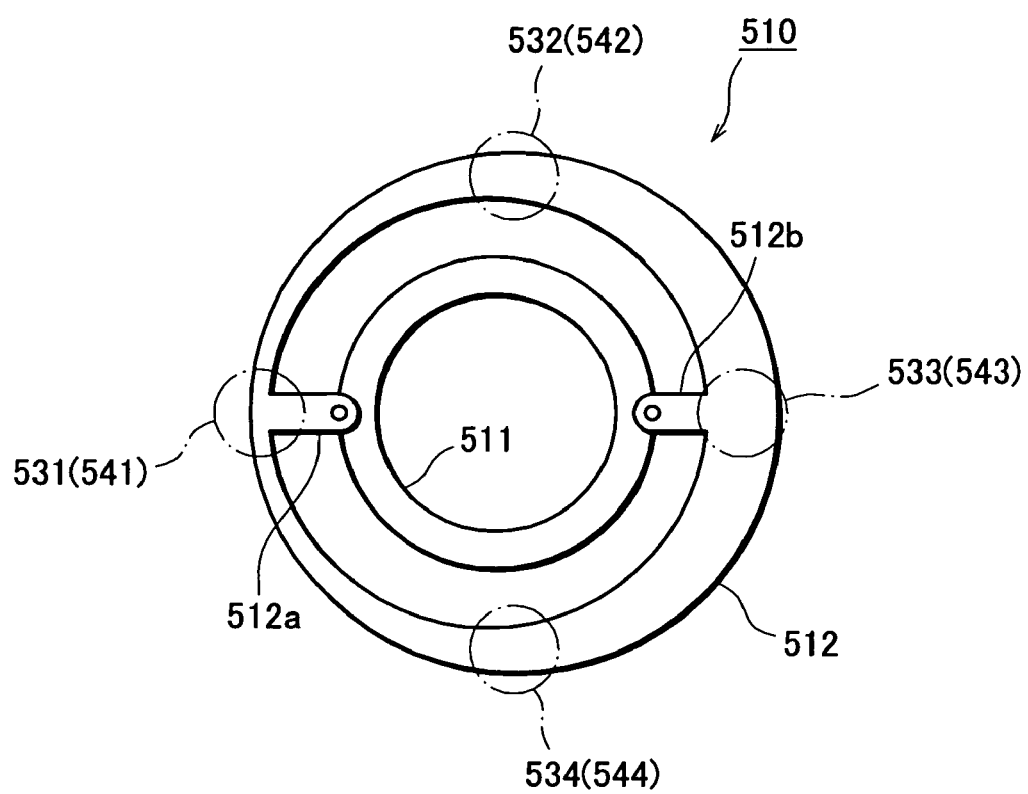
FIG. 10 is an explanatory drawing generally showing the positional relation between the sensing unit and the coil of the rotor according to the second embodiment shown in FIG. 1.

As shown in FIG. 9 and FIG. 10, a rotation sensor 2 according to the second embodiment of the invention includes a rotor 510 to be mounted to a rotating shaft S, stationary cores 531-534 (541-544) having a core body formed of insulative magnetic material and at least one exciting coil to be stored in the core body, and a rotation angle detecting unit 600. As shown in FIG. 10, the exciting coils 531b-534b (541b-544b) include, for example, four exciting coils on one side disposed at regular intervals circumferentially of the rotor, so that the rotation angle of the rotor from 0° to 360° is detected through. As in the first embodiment, the number of the stationary cores 200 to be arranged may be changed according to the rotation angle to be detected.

The stationary cores 531-534 (541-544) and the rotation angle detecting unit 600 are stored in the case 20 formed of metal or insulation magnetic material having a shielding property with respect to an alternating magnetic field, and is mounted to the fixed member (not shown) positioned in the vicinity of the shaft S via the case 20. The case 20 includes the upper case 21 and the lower case 22. The rotation sensor 2 is adapted to detect the rotation angle of the shaft S based on the fluctuation of impedance of the exciting coils 531b-534b (541b-544b) caused by the rotation of the shaft S.

Figure 11:
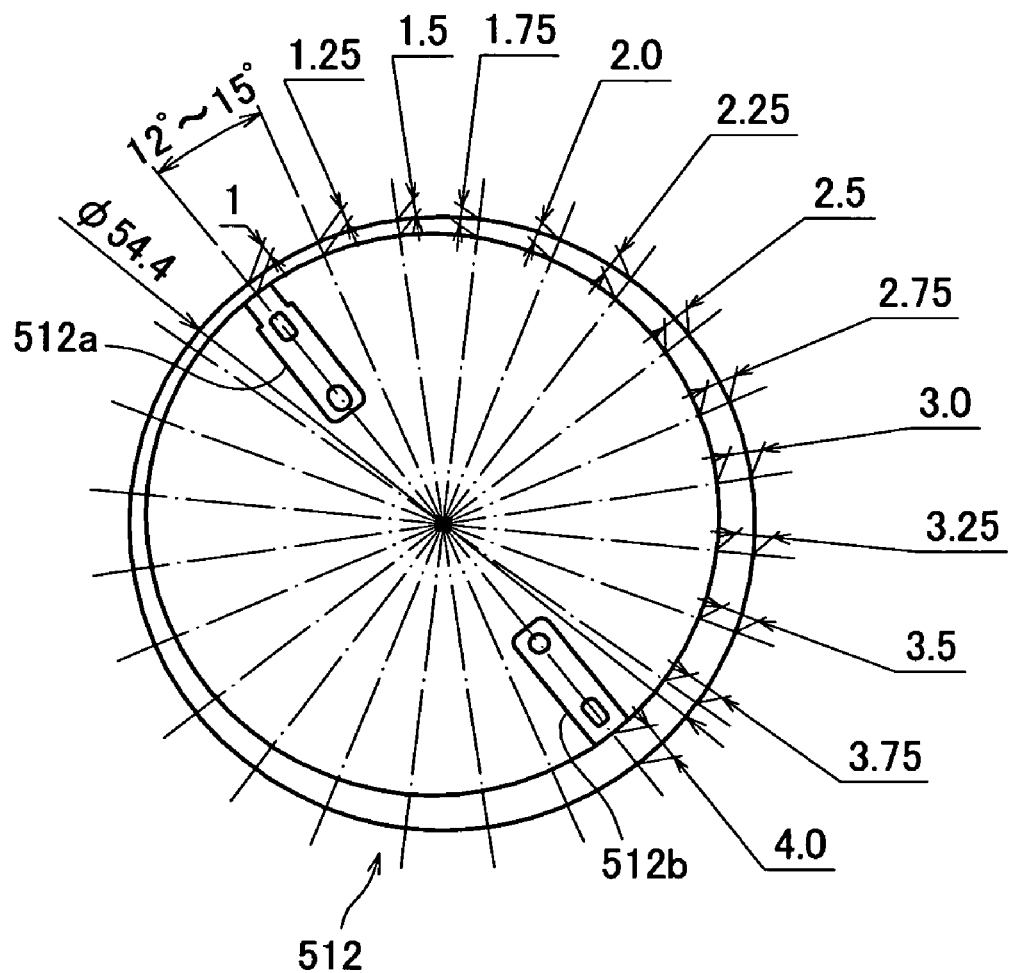
FIG. 11 is a plan view showing the sensing unit of the rotor of the rotation sensor according to the second embodiment of the invention.

As shown in FIG. 10, the rotor 510 includes a supporting member 511 formed of insulative magnetic material, and a sensing unit 512 connected to the supporting member 511 via stay members 512a, 512b and having a width continuously varying in the circumference direction thereof. As shown in FIG. 10 and FIG. 11, the sensing unit 512 includes a narrow portion having the minimum width, and the wide portion having the maximum width on the opposite side from the narrow portion in the radial direction. The sensing unit 512 is formed of metal having conductivity such as aluminum, copper, silver, iron, or brass. Then, it is configured to vary in the radial width corresponding to the rotation angle of the rotor 510, so that an eddy current of a magnitude based on the area of the widthwise portion of the sensing unit 512 corresponding to the respective exciting coils is induced by an alternating magnetic field, described later in association with the rotation of the rotor.

Then, the output signals generated by the cooperation between the exciting coils 531b-534b (541b-544b) and the sensing unit 512 vary linearly according to the rotation angle of the rotor 510 by the area of the sensing unit 512 corresponding to the stationary cores 531-534 (541-544) in the predetermined rotation angle of the rotor (the projecting area of the sensing unit 512 with respect to the stationary core of the sensing unit 512 when viewed in the direction orthogonal to the sensing surface of the sensing unit 512, referred to as "projecting area of the sensing unit with respect to the stationary core", hereinafter) being linearly varied in proportional to the variations in the rotation angle of the rotor 510.

As an example of the method of determining the shape of the sensing unit 512, as shown in FIG. 11, the projecting area with respect to the stationary cores 531-534 (541-544) are calculated using CAD (Computer Aided Design System) at every 12°-15° in the direction of circumference of the sensing unit 512 in the course of designing process. The sensing unit 512 shown in FIG. 11 is about 54 mm in reference diameter, and is adapted to vary arithmetically by 0.25 mm from the narrowest portion 1 mm to the widest portion 4 mm in width of the sensing unit at every 12°-15° in the direction of circumference of the sensing unit 512. The stationary cores 531-534 (541-544) each have a dimension of 16 mm in outer diameter and part of it overlaps when viewed in the direction orthogonal to the sensing surface of the sensing unit 512. This overlapped area corresponds to a projecting portion with respect to the stationary cores 531-534 (541-544). The width of the sensing unit 512 varies within the range smaller than the outer diameter of the stationary cores 531-534 (541-544).

On the other hand, the stationary cores 531-534 on one side which are to be fixed to the lower case 21 are mounted on a printed board constituting the rotation angle detecting unit 600, and disposed on the opposite side with the intermediary of the rotor 510 so as to oppose the stationary cores 541-544 on the other side at a distance G therebetween. The stationary cores 541-544 on the other side are mounted to the upper case 22 of the case 20. The stationary cores 531-534 on one side include core bodies 531a-534a formed of insulative magnetic material and exciting coils 531b-534b to be stored in the core bodies 531a-534a. The stationary cores 541-544 on the other side include the core bodies 541a-544a formed of insulative magnetic material and the exciting coils 541b-544b to be stored in the core bodies 541a-544a. The exciting coils 531b-534b and the exciting coils 541b-544b, being connected in serried respectively, are connected electrically to the printed board of the rotation angle detecting unit 600 in the case 20, and generate an alternating magnetic field around the coils by being flown with the alternating exciting current, so that a magnetic circuit as shown by dotted line X in FIG. 9 is established between the respective pairs of stationary cores.

As shown in FIG. 9, the rotation angle detecting unit 600 is fixed to the lower case 21, describe later, of the case 20. The rotation angle detecting unit 600 is adapted to be connected to the power supply or the wire harness for transmitting signals via a plurality of electric cables 600a extending outward from the case 20, and to the external device provided outside the case 20.

Figure 12:
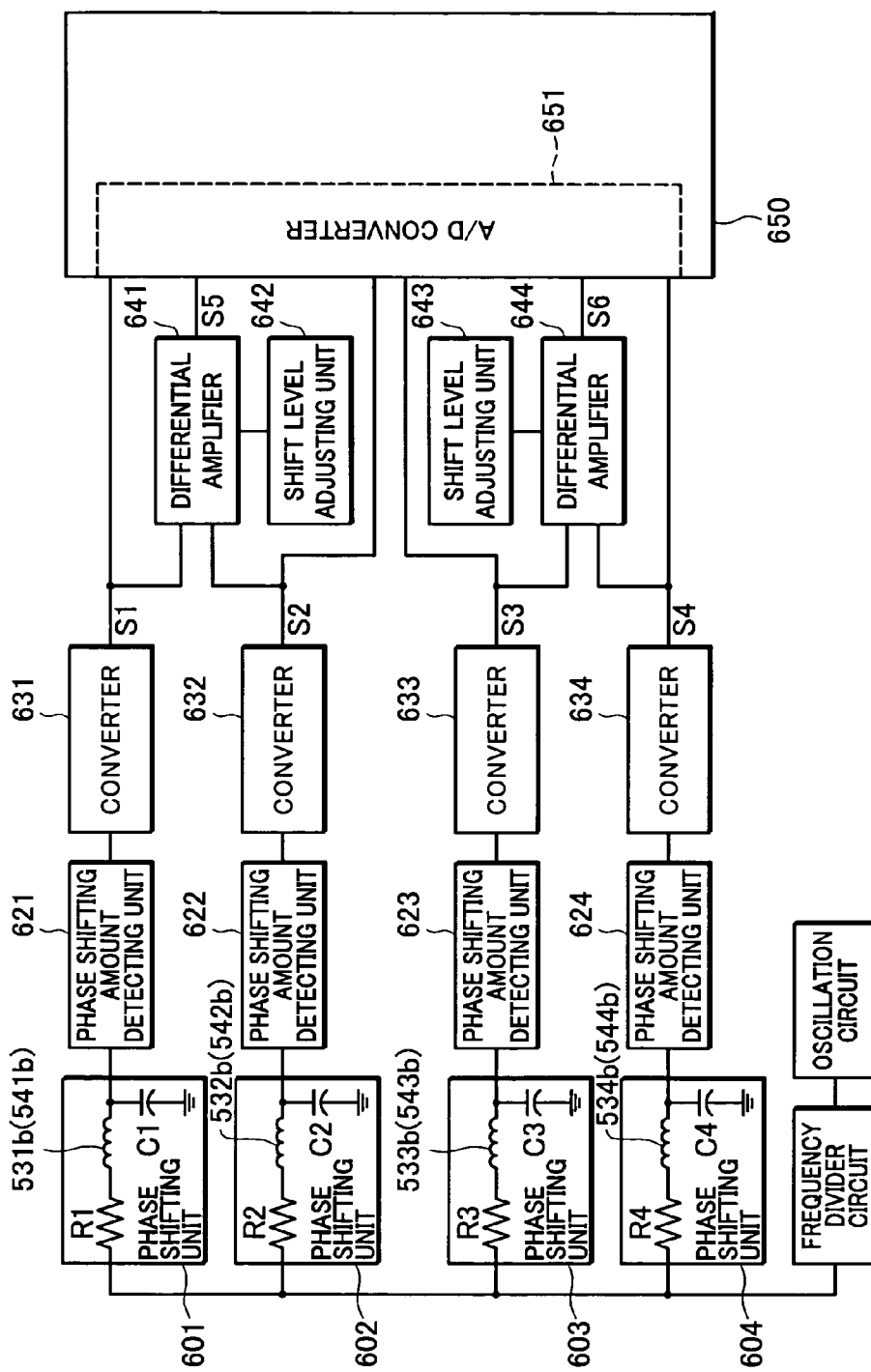
FIG. 12 is a block diagram showing a signal processing circuit relating to detection of the rotation angle of the rotation sensor according to the second embodiment of the invention.

As shown in a circuit block diagram in FIG. 12, the rotation angle detecting unit 600, a phase shifting units 601-604, a phase shifting amount detecting units 621-624, and converters 631-634 are connected in series in four parallel rows between the frequency divider circuit 660 and the measuring unit 650. The output signal S1 from the converter 631 and the output signal S2 from the converter 632 are differentiated and then amplified by a differential amplifier 641, and are outputted to an A/D converter 651 of a measuring unit 650 as the voltage signal output S5. A shift level adjusting unit 642 for adjusting the voltage level of the amplified voltage value is connected to the differential amplifier 641.

Likewise, the output signal S3 from the converter 633 and the output signal S4 from the converter 634 are differentiated and then amplified by the difference amplifier 644, and are outputted to the A/D converter 651 of the measuring unit 650 as the voltage signal output S6. A shift level adjusting unit 643 for adjusting the voltage level of the amplified voltage value is connected to the differential amplifier 644. The frequency divider circuit 660 may be provided as needed. Likewise, a buffer amplifier may precede the phase shifting unit 601~604.

Subsequently, the signal processing method in the rotation sensor 2 will be described in detail.

An oscillation circuit 670 outputs oscillation signals of a specific frequency via a frequency divider circuit 660 to the phase shifting units 601-604 including resistances R1-R4, exciting coils 531b-534b, 541b-544b, and capacitors C1-C4 shown in FIG. 12. At this time, the impedances of the respective exciting coils 531b-534b, 541b-544b vary according to the magnitude of generation of the eddy current in the sensing unit 512 of the rotor, and in association with variations in the impedance, the phases of the voltage signals at both ends of the respective capacitors C1-C4 vary correspondingly. The voltage signals at both ends of the capacitors C1-C4 are outputted to the phase shifting amount detecting units 621-624, where the phase shifting amount of the voltage signals at both ends of the respective capacitors C1-C4 are detected.

The converters 631-634 convert the detected phase shifting amount to a corresponding voltage value. Then the outputs S5, S6, which are amplified two differential signals, and the output signals S1-S4 from the four converters 631-634 are supplied to the measuring unit 650 including, for example, a single-chip microprocessor or the like. Accordingly, the measuring unit 650 compares the level (magnitude relations) of the four output signals S1-S4 in the first place. Then, the positions where the exciting coils 531b-534b or the exciting coils 541b-544b are disposed are determined at the sensing unit 512 of the rotor 510.

Figure 13:
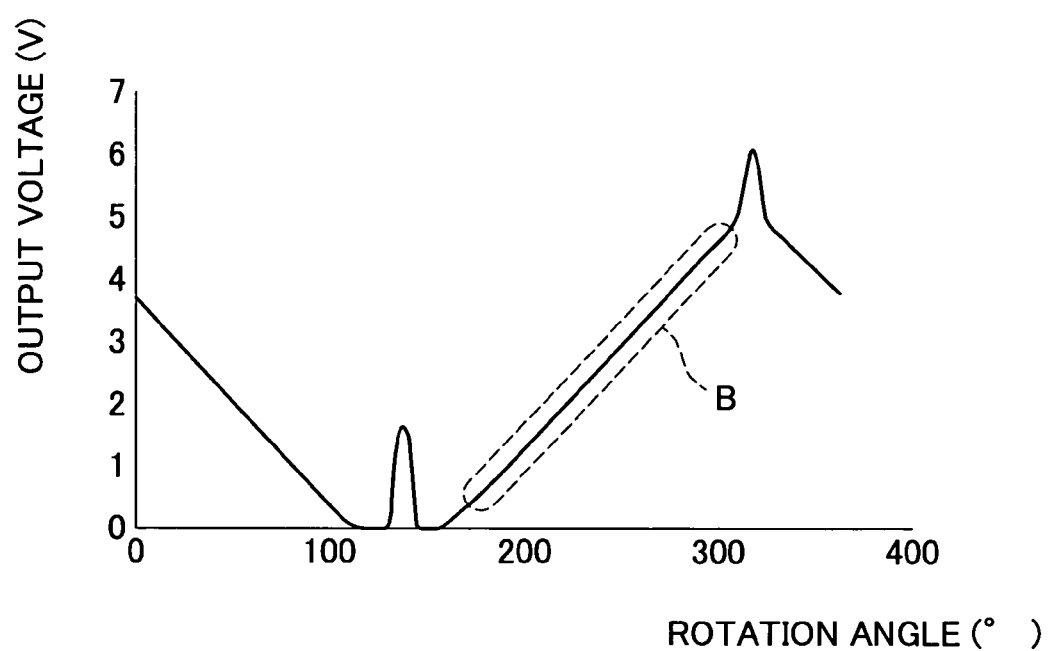
FIG. 13 is a drawing showing a result of measurement when the rotation angle and the output voltage value are measured using the rotation sensor shown in FIG. 1.

Accordingly, for example, the respective output voltages (V) of the exciting coil 531b as shown in FIG. 13 are obtained. As is clear from the relation between the rotation angle and the output voltages of the rotor relating to the exciting coil 531b of the same drawings, projected peaks corresponding to a connecting portions 511c at two positions of the rotor 511 appears at the positions apart from each other by 180°. Also, except for these portions, a detected band B where the output voltage, which varies linearly in proportion to the rotation angle and is improved in characteristics in comparison with the above-described rotation sensor in the related technology, can be obtained appears. In addition, by arranging the four pairs of the exciting coils at regular intervals in the circumferential direction of the sensing unit, the detected band B which corresponds to the rotation angle of the rotor and is superior in linearity can be generated alternately and continuously from 0° to 360° in rotation angle of the rotor. Also, by using the detected band B respectively, the rotation angle of the rotor 511 can be measured accurately.

EXAMPLE 2

A comparative evaluation was performed between the rotation sensor according to the second embodiment (hereinafter, referred to as "the present example") and the rotation sensor in the related art which only has a sensing unit having a simple outline obtained simply by displacing and combining the inner diameter circle and the outer diameter circle (hereinafter, referred to as "a comparative example".

Figure 14:
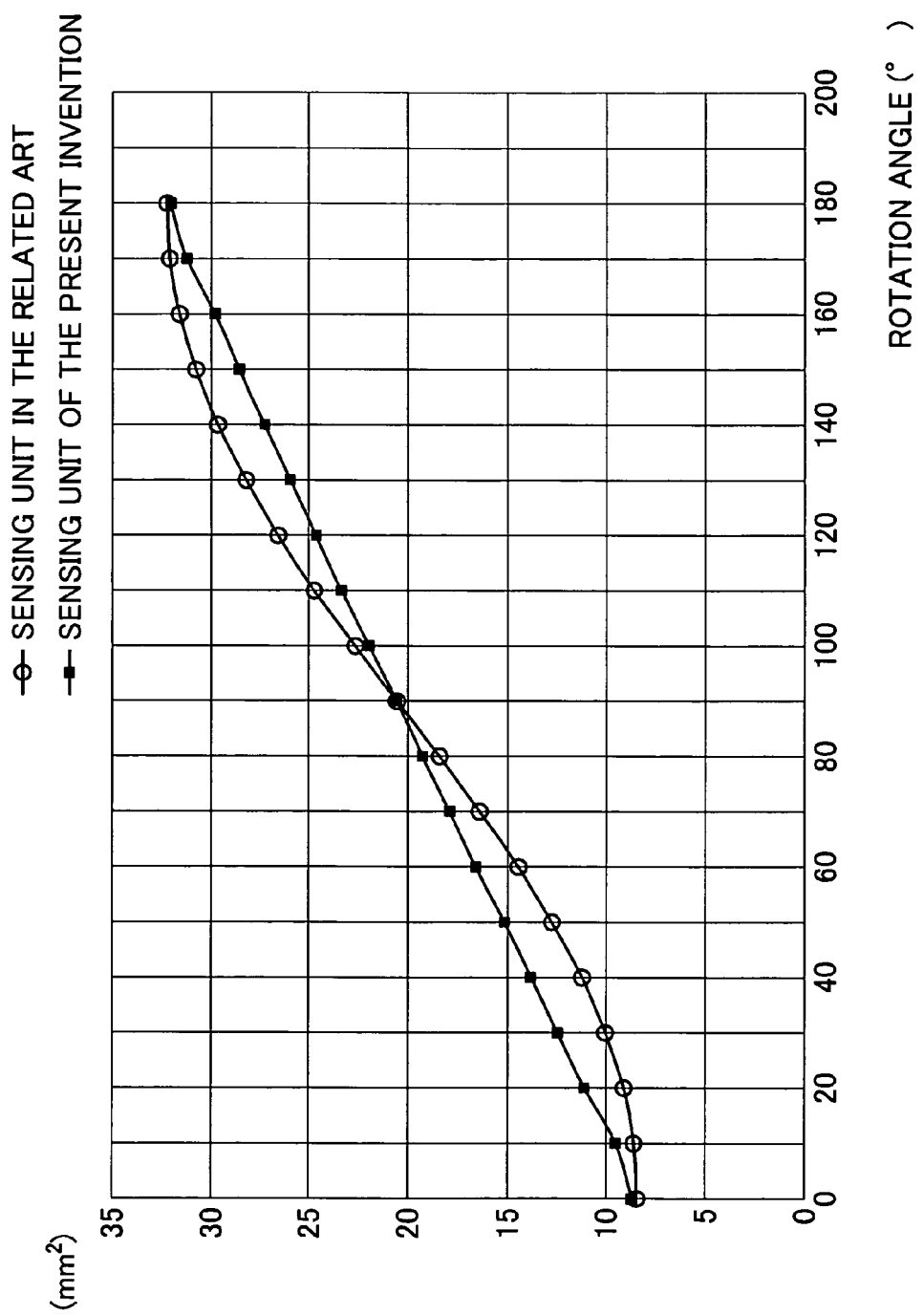
FIG. 14 is a drawing showing the areas of the sensing unit corresponding to the stationary cores relating to the rotation sensor shown in the second example in the second embodiment, and the rotation sensor in the comparative example, plotted at every predetermined rotation angle and shown continuously.
Figure 15:
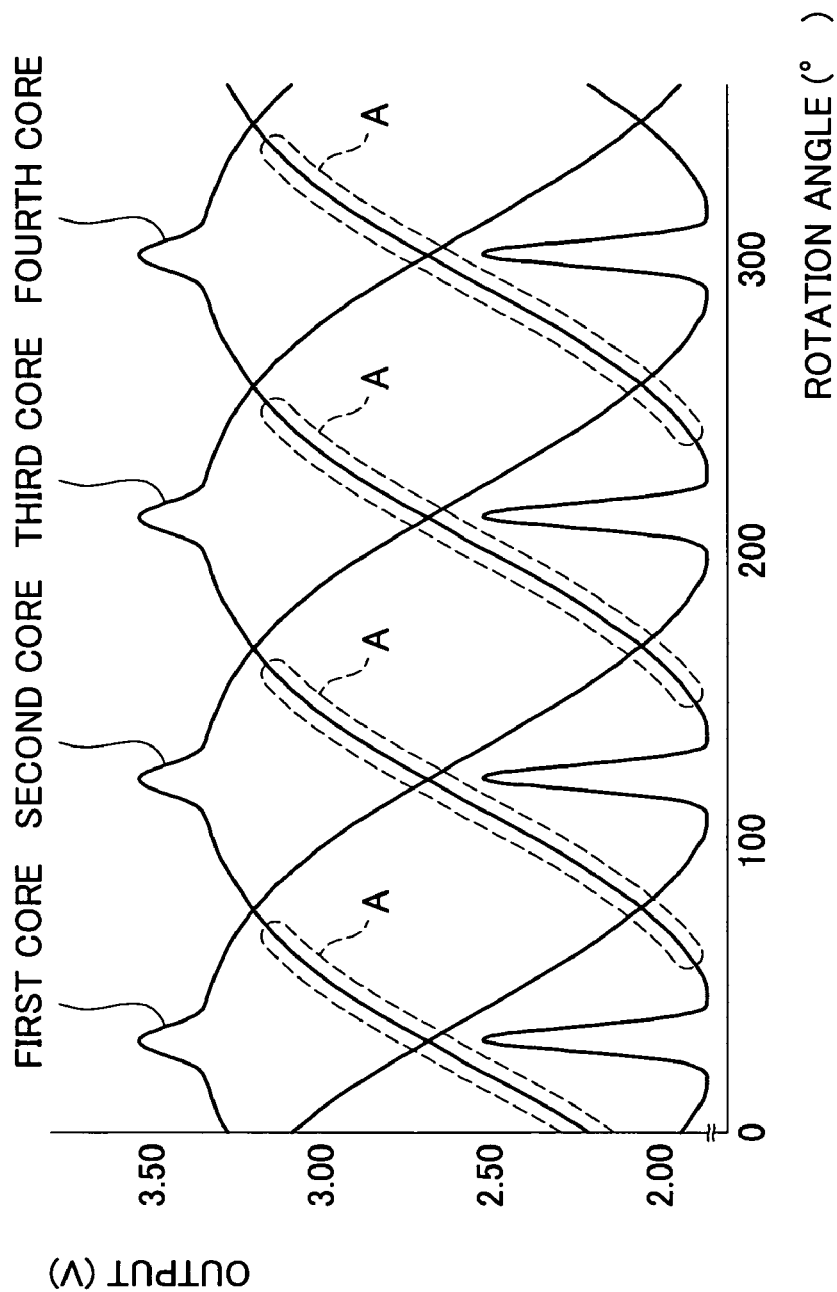
FIG. 15 is a drawing showing the value of the detected output relating to the rotation angle obtained by the rotation sensor in the related technology.
Figure 16:
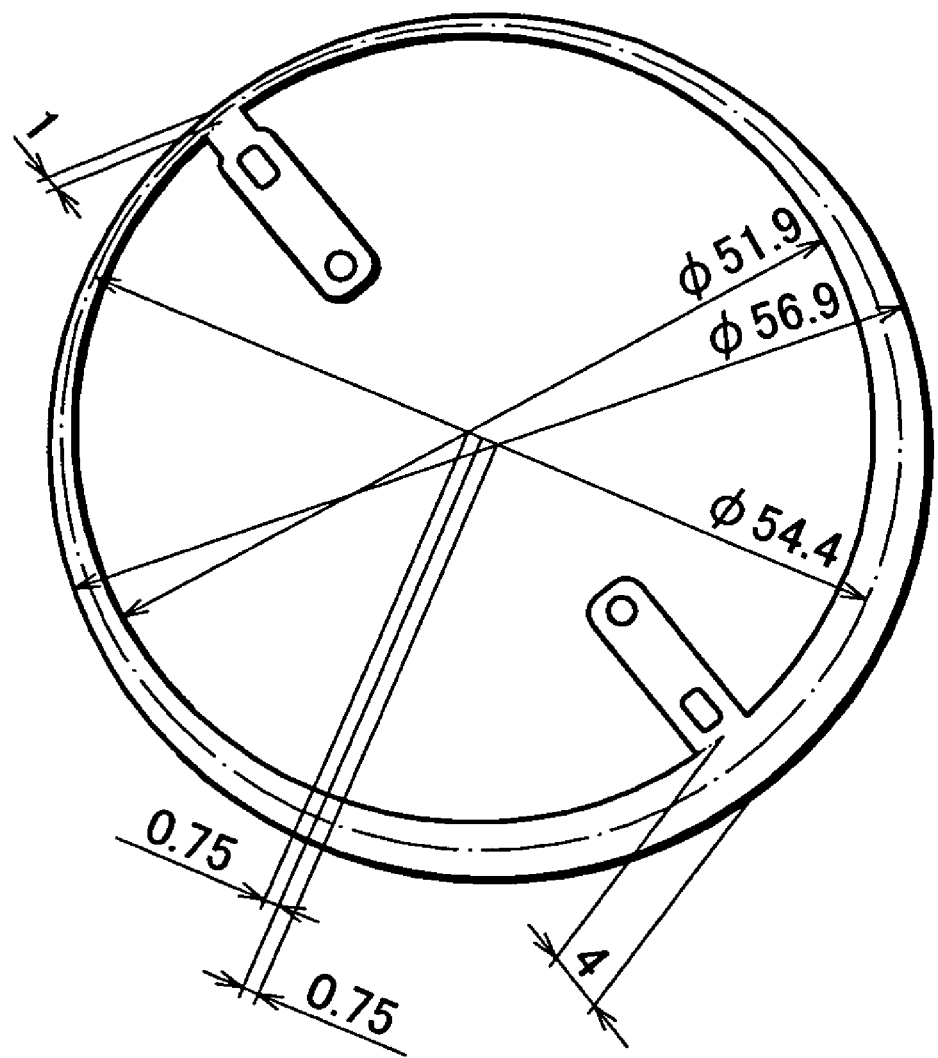
FIG. 16 is a plan view showing the sensing unit of the rotor used for the rotation sensor in the related art.
Figure 17A:
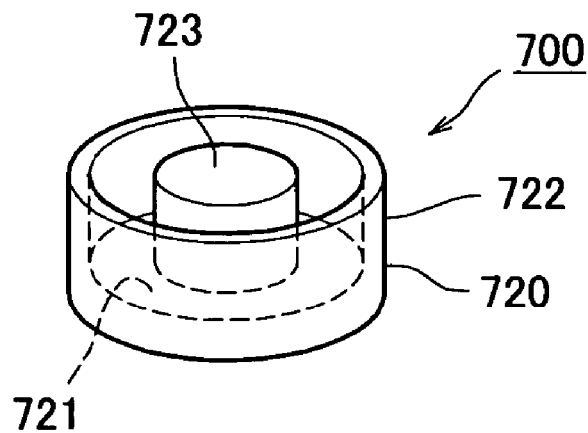
FIG. 17A and FIG. 17B are a perspective view of the core body used for the rotation sensor in the related technology (FIG. 17A), and a plan view of the core body showing lines of magnetic flux acting on the core body (FIG. 17B).
Figure 17B:
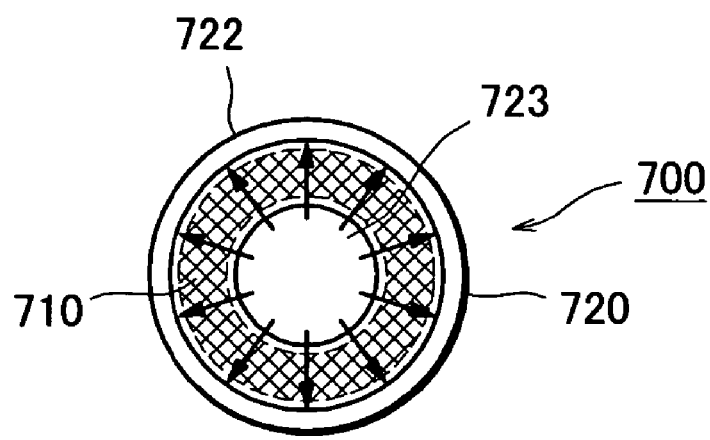

For this comparative evaluation, the rotor was rotated by 10°, and the detected outputs of the specific stationary core at those points of time were plotted and measured over one turn of the rotor. The result of the comparative test is shown in FIG. 14. As is clear from the drawing, it was found that the present example is superior in linearity through the entire range of the rotation angle of the rotor from 0° to 180° in comparison with the comparative example. Accordingly, it was proved that accurate detection of rotation angle is achieved by using the rotation sensor provided with the rotor according to the present example without performing specific signal correcting process.

As described above, when the rotation sensor according to the invention is used in which not only the shape of the coil core is devised as in the first embodiment, but also the shape of the sensing unit is devised as in the second embodiment, the problems described above in association with assembly of the rotation sensor, additionally the problems described above in association with the use of the rotation sensor are solved at once, and hence a suitable rotation output according to the rotation angle of the object to be detected can be obtained, whereby detection of the rotation angle with high degree of accuracy is achieved.

The rotation sensor according to the invention is suitable for detecting rotation angle of the steering device for a motor vehicle. However, the rotation sensor according to the invention is applicable to any types of detection as long as it obtains the relative rotation angle or the rotation torque between the rotary shafts which rotate with respect to each other, such as a robot arm.

What is claimed is:

1. A rotation sensor to be mounted to a rotating member for detecting the rotation angle of the rotating member, comprising:
    a rotor mounted to a rotating shaft and having a conductive sensing unit which varies in width circumferentially thereof; and
    stationary cores each having an exciting coil being flown with an alternating exciting current for establishing a magnetic circuit with respect to the sensing unit of the rotor and a core body formed of insulative magnetic material for retaining the exciting coil, and being mounted to a fixed member and disposed so as to oppose the sensing unit of the rotor at a distance in the axial direction of the shaft,
    wherein the core body includes a peripheral wall portion formed in an area of the core body that opposes the sensing unit, the peripheral wall portion not being formed in at least part of an area of the core body that does not oppose the sensing unit, and
    wherein a width of the sensing unit is adapted to vary arithmetically from a narrowest width portion to a widest width portion of the sensing unit in a circumferential direction such that the areas of the portion of the sensing unit corresponding to the stationary cores vary linearly in proportion to variations in the rotation angle of the rotor and output signals generated by the cooperation between the exciting coil and the sensing unit of the rotor vary linearly in accordance with the rotation angle of the rotor.

2. A rotation sensor according to claim 1, wherein a projection surrounded by the exciting coils of the core body is formed into an elongated shape in the direction intersecting with the direction in which the sensing unit extends.

3. A rotation sensor according to claim 2, wherein only the center portion of the projection of the core body surrounded by the exciting coil is formed to be lower than the both sides thereof.

4. A rotation sensor according to claim 1, wherein the core body further comprises a projection extending from a center of the core opposing the sensing unit and a maximum width of the sensing unit is narrower than a dimension of the projection opposing the sensing unit.

5. A rotation sensor according to claim 1, wherein the sensing unit is adapted to vary arithmetically in width by a predetermined amount from the narrowest to widest portion of the sensing unit at every 12-15 degrees in a circumferential direction of the sensing unit.

6. A rotation sensor according to claim 1, wherein the sensing unit is adapted to vary arithmetically in width by a predetermined amount of 0.25 mm.

7. A rotation sensor to be mounted to a rotating member for detecting the rotation angle of the rotating member, comprising:

a rotor mounted to a rotating shaft and having a conductive sensing unit which varies in width circumferentially thereof; and stationary cores each having an exciting coil being flown with an alternating exciting current for establishing a magnetic circuit with respect to the sensing unit of the rotor and a core body formed of insulative magnetic material for retaining the exciting coil, and being mounted to a fixed member and disposed so as to oppose the sensing unit of the rotor at a distance in the axial direction of the shaft, wherein output signals generated by the cooperation between the exciting coil and the sensing unit of the rotor vary linearly in accordance with the rotation angle of the rotor and wherein only a center portion of a projection of the core body surrounded by the exciting coil is formed to be lower than sides of the projection.

* * * * *